United States Patent [19]

Loux

[11] 4,284,289
[45] Aug. 18, 1981

[54] DEVICE FOR SUPPORTING BICYCLE SECURITY CHAINS AND CABLES

[76] Inventor: Edwin E. Loux, 2841 Adams St., Alameda, Calif. 94501

[21] Appl. No.: 58,078

[22] Filed: Jul. 16, 1979

[51] Int. Cl.³ .......................... B62H 5/00; B62J 11/00
[52] U.S. Cl. .................................. 280/289 L; 70/233; 224/30 R
[58] Field of Search .......... 280/289 R, 289 L, 289 A, 280/289 G; 224/30 R, 32 R; 70/233, 234, 235; 211/5

[56] References Cited

U.S. PATENT DOCUMENTS

| | | |
|---|---|---|
| 595,240 | 4/1897 | Lincoln .............................. 224/32 R |
| 1,260,937 | 5/1917 | Muller, Jr. .......................... 224/30 R |
| 2,248,971 | 7/1941 | Duffy ................................ 280/289 L |
| 2,531,902 | 2/1949 | Baron ................................ 224/32 R |
| 3,910,602 | 10/1975 | Linder .............................. 280/289 L |
| 3,981,166 | 9/1976 | Madonna .......................... 224/32 R |
| 4,007,614 | 2/1977 | Schott et al. ...................... 280/289 L |
| 4,112,720 | 9/1978 | Green ................................ 70/233 |

Primary Examiner—Joseph F. Peters, Jr.
Assistant Examiner—Donn McGiehan

[57] ABSTRACT

A device which supports and stores security chains and cables as they are wrapped around the seat post of a bicycle. It also aids in the convenience of chain and cable storage while protecting local mechanical apparatus and painted frame surfaces near the seat post.

2 Claims, 3 Drawing Figures

DEVICE FOR SUPPORTING BICYCLE SECURITY CHAINS AND CABLES

This invention relates to an improved means to support security chains and cables; and more particularly concerns a more orderly means of supporting such security devices and adding protection to local mechanical apparatus and painted surfaces.

Anti-theft security devices such as chains and cables are commonly stored wrapped around the seat post and resting on the adjacent framing. The chains and cables while in this stored position will usually fall and hang in various forms of disarray, creating a physical entanglement, visual disorder and mechanical malfunction or damage to local brakes, cables, wheels and painted surfaces.

An object of this invention is to provide an improved means to support chains, cables and similar security devices.

Another object of this invention is to increase the orderly use of such security devices.

Yet another object of this invention is to provide protection from such security devices by preventing said devices from physically contacting brake mechanisms, cables, wheels and painted frame surfaces thereby eliminating resultant common problems.

Such objects are achieved together with still other objects which will become apparent from considering the following disclosure of the invention, including drawings, wherein.

Figure 1:
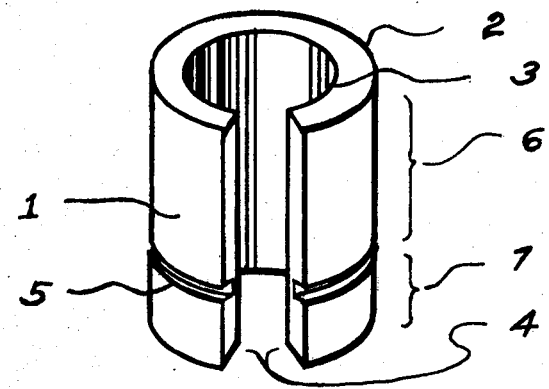
FIG. 1 is a perspective view of the grommet bearing with the disc slot (inconsequentially increased to scale to the disc in FIG. 2 to improve visual understanding).

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. All references in the specification and drawings that refer to the vertical or horizontal direction do so only as a pose for descriptive purposes.

Looking now at the drawings, FIG. 1 illustrates the tubular body of the grommet bearing 1 having a vertical compression space 4 with a circumferential groove 5. There are three different tubular diameters involved: The large outside diameter 2, the intermediate diameter of which the groove 5 holds the disc 10 and the small inside diameter 3 which encircles the seat post 12. The position of the groove from the large end 6 in proportion to the small end 7 allows variation from vertical reversability as applied to the seat post 12.

Figure 2:
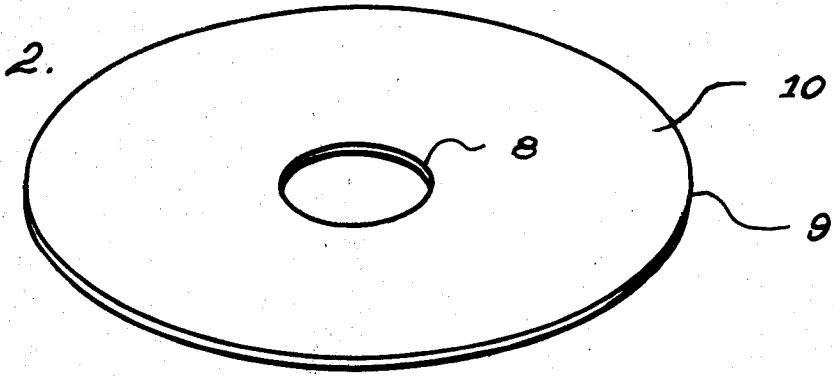
FIG. 2 is a perspective view of the disc.

FIG. 2 illustrates the disc 10 being relatively flat, circular and in a horizontal position and having two common diameters: the outside diameter 9 and the inside diameter 8 which is held into place by the grommet bearing groove 5.

Figure 3:
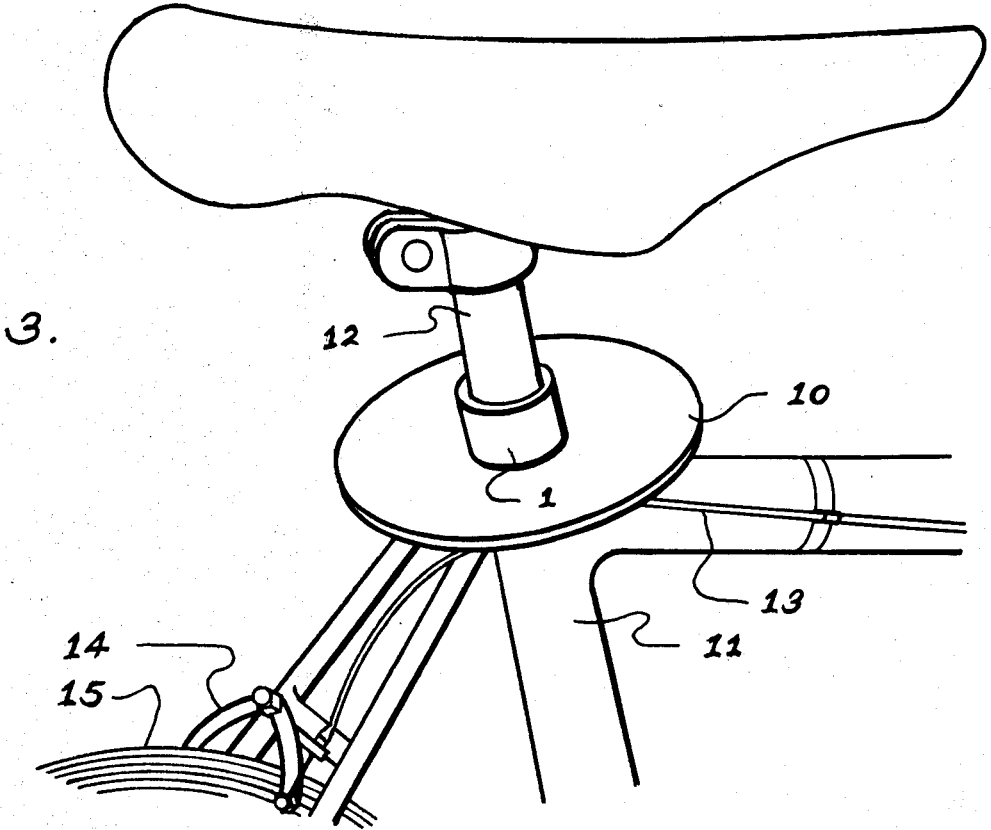
FIG. 3 is a perspective view showing the invention as it relates to the bicycle with associated bicycle parts numbered.

FIG. 3 is a relational view showing the disc 10 held into place by the grommet bearing 1 which is also held into place by the bicycle seat post 12 and the seat mast 11 on which the grommet bearing freely rests.

Also previously referenced in specifications is herein illustrated for further clarification is: rear brake cable 13, rear brake calipers (partly shown) 14, rear wheel (partly shown) 15 and frame (seat mast 11) having painted surfaces not shown.

The simplicity of use of this invention is self evident.

The advantages of this invention would result in the following: an improvement in the manipulative and visual order in supporting security chains, cables and like devices around the bicycle seat post. This invention will also thereby eliminate said devices from interferring with or damaging the vehicles rear brake, cable, wheel and painted frame surfaces. Thus the improvement of the seat post area provides ease of use, eliminates local vehicle damage and increases operational vehicle safety from possible mechanical malfunction.

It is to be understood that the form of the invention herewith shown and described is to be taken as a preferred embodiment. Various changes may be made in the shape, size, and arrangement of parts, for example: Equivalent elements may be substituted for those illustrated and described herein, parts may be reversed and certain features of the invention may be utilized independently of the use of other features all without departing from the spirit or scope of the invention as defined in the subjoining claims. The grommet bearing and the disc may also be made or molded as one unit being so justified by the spirit of the invention and not determined by the number of its parts.

The claims of the invention are now presented and the terms of such claims should be further understood in view of the language of the preceding specification and the Figures of the drawings.

I claim:

1. A device for storing security chains and cables on a bicycle having a seat post, comprising:
   a tubular cylinder having a circumferential groove on the outside wall and a longitudinal compression space;
   a circular disc coupled in said groove at right angles to the longitudinal axis of said cylinder to create a small platform; and
   said cylinder and said disc being made of a resilient material, and as a unit are adapted to fit around the existing bicycle seat post.

2. A device for supporting and storing bicycle security chains and cables on a bicycle, having a seat post and a seat mast, comprising:
   (a) a grommet bearing in the form of a small tubular cylinder having an inside diameter corresponding to the outside diameter of the bicycle seat post, made of a resilient material, and having two distinct and functional shapes:
      (1) a longitudinal compression space along the axial wall of said grommet bearing to allow flexing and therefore to accommodate said seat post, and
      (2) an annular groove in the outside diameter of the wall; and
   (b) a disc made of a thin, resilient material and having two diameters:
      (1) an inside diameter adapted to be locked into the annular groove and to close the longitudinal compression space on said grommet bearing, and
      (2) an outside diameter extending outward less than the size of an average bicycle seat;
   whereby said grommet bearing and said disc as a unit are adapted to fit around the existing bicycle seat post and rest on the seat mast.

* * * * *